(12) United States Patent
Noda

(10) Patent No.: US 8,622,438 B2
(45) Date of Patent: Jan. 7, 2014

(54) PIPING SYSTEM

(75) Inventor: Kensuke Noda, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 15 days.

(21) Appl. No.: 13/280,733

(22) Filed: Oct. 25, 2011

(65) Prior Publication Data

US 2012/0098252 A1 Apr. 26, 2012

(30) Foreign Application Priority Data

Oct. 26, 2010 (JP) .................................. 2010-239920

(51) Int. Cl.
*F16L 51/02* (2006.01)

(52) U.S. Cl.
USPC .......................................... 285/228; 285/227

(58) Field of Classification Search
USPC .......................................... 285/228, 227, 179
See application file for complete search history.

(56) References Cited

U.S. PATENT DOCUMENTS

| | | | |
|---|---|---|---|
| 2,721,746 A * | 10/1955 | Schindler ....................... | 285/228 |
| 2,960,354 A * | 11/1960 | Addie et al. ................... | 285/228 |
| 3,198,558 A * | 8/1965 | Braden ........................... | 285/228 |
| 3,359,016 A * | 12/1967 | Sarlls, Jr. ....................... | 285/228 |
| 4,265,472 A | 5/1981 | Ipsen | |
| 4,502,714 A * | 3/1985 | Brown et al. ................... | 285/227 |
| 4,687,639 A * | 8/1987 | Whiteside, II ................ | 285/228 |
| 6,382,682 B1 * | 5/2002 | Taneda ........................... | 285/228 |

FOREIGN PATENT DOCUMENTS

JP 10-141565 A 5/1998

* cited by examiner

*Primary Examiner* — David E Bochna

(74) *Attorney, Agent, or Firm* — Knobbe Martens Olson & Bear LLP

(57) ABSTRACT

A piping system comprising: a main pipe; a first pipe member connecting an equipment nozzle and the main pipe via a first bellows; a second pipe member connected to a side part of the main pipe; a third pipe member connected to the other end of the second pipe member via a second bellows; first and second tie rod support members fixed to the first and third pipe members; tie rods that interconnect the tie rod support members; and an anchor that sets a portion of the main pipe as a fixed point. Lengths of the pipe members between the tie rod support members are determined so that the first bellows contracts by thermal expansion of the equipment nozzle, the first pipe member, and the pipe member of the main pipe below the anchor, and the second bellows contracts by an amount equally to that of the first bellows.

9 Claims, 4 Drawing Sheets

PIPING SYSTEM

This application is based upon and claims the benefit of priority from Japanese patent application No. 2010-239920, filed on Oct. 26, 2010, the disclosure of which is incorporated herein in its entirety by reference.

BACKGROUND OF THE INVENTION

1. Field of the Invention

The present invention relates to a piping system connected to equipment in a petrochemical plant or a power plant. The equipment is a rotary machine such as an expander of a fluidized catalytic cracker (FCC) or to a high-temperature reactor, and the like in which the allowable value of a load applied from a pipe arrangement is small.

2. Description of the Related Art

Since the expander of the FCC has a precise rotational mechanism, any excessive force or moment must be prevented from being applied to an equipment of this type. Hence, in a metal piping system connected into an equipment nozzle installed in such an equipment, measures are taken to reduce loads on the nozzle.

One of such measures taken conventionally is installing several tied expansion joints installed in the piping system to absorb displacement caused by thermal displacement of the equipment nozzle and thermal expansion of the pipe during facility running. As the expansion joint, a bellows type expansion joint including a bellows (refer to Japanese Industrial Standard (JIS) B 2352) is generally known. Table 1 of JIS B 2352 shows several types of bellows type expansion joints. Applying a simplest untied bellows type expansion joint among them to connect the pipes to each other enables absorption of axial displacement, axial-perpendicular displacement, and angular displacement of the pipe in an arbitrary plane excluding a twist. As a result, loads on the nozzle can be reduced by converting large force due to bending of pipe into small force due to bending of bellows.

In a joint of this type, however, a force (hereinafter, internal-pressure thrust) generated by internal pressure in the bellows in a direction on separating the pipes from each other (or direction for attracting each other) is applied to the equipment nozzle. This makes it difficult to apply the simple untied bellows type expansion joint when a pipe bore or the internal pressure becomes larger. In such a case, a tied bellows type expansion joint is used, which includes a mechanism of restricting axial expansion of the bellows no to transmit the internal-pressure thrust to the outside of the bellows. Well-known types of tied bellows type expansion joints include a hinge type expansion joint that absorbs only angular displacement in one plane by using a hinge at pipe ends connected via the bellows, a gimbal type expansion joint that absorbs not only the angular displacement in one plane but also angular displacement in an arbitrary plane, and a universal expansion joint that absorbs axial-perpendicular displacement in the arbitrary plane (refer to JP10-141565A).

Where the piping system moves vertically due to thermal expansion of each piping member, a special pipe support device to support piping weight with following the vertical movement is necessary. For this purpose, the piping system is installed in a lifted state by using spring hanger supports such as variable spring hangers or constant spring hangers that has a mechanism to reduce load variation by the movement.

As a method for using the bellows type expansion joint to absorb the axial displacement without transmitting the internal-pressure thrust to the outside of the bellows type expansion joint, a bellows type expansion joint of pressure balanced type is used, which additionally includes a bellows to cancel the internal-pressure thrust and tie rods disposed to permit the axial displacement in a state of keeping the balance (refer to FIG. 8 of JP10-141565A or FIGURES of U.S. Pat. No. 4,265,472).

As described above, in the conventional piping system that includes several tied bellows type expansion joints, the loads applied on the equipment nozzle can be reduced. However, this load reduction measure is becoming insufficient due to recent trend toward larger capacity plant.

When a pipe bore increases as the plant is enlarged, the internal-pressure thrust applied at bellows becomes larger, and the spring constant of the bellows itself increases. The pipe also becomes longer, and hence displacement to be absorbed is enlarged. A frictional force at a sliding portion such as the hinge or the gimbal increases, causing an increase in loads on the equipment nozzle. The spring hanger supports also have friction at sliding portion and spring itself, and reaction force generates during movement. This force is called as load for initial movement and it becomes approximately 5% of supporting load. Thus, an influence of the force in the spring hanger supports on the equipment nozzle can no longer be negligible. For example, pipe weight is 11 tons per meter in the case of a stainless-steel pipe having a diameter of $\phi 3500$ millimeters and a thickness of 135 millimeters. When 14 meters of pipe is supported by spring hanger supports on the equipment nozzle, total pipe weight is 150 tons and the load for initial movement reaches about 7.5 tons. As a result, this load becomes predominant, exceeding the allowable value of a load for the equipment nozzle.

In order to prevent application of various loads including the internal-pressure thrust, the spring reaction force, and the frictional force of the piping system, and the operation resistance of the hanger support on the equipment nozzle, a method for installing a bellows type expansion joint of pressure balanced type between the equipment nozzle and the piping member and setting a fixed point (anchor) as close as possible to the bellows of the piping member to fix the piping system, has been considered on a conceptual basis. This anchor prevent any piping load, friction and reaction force being transmitted to the equipment nozzle side from another side of the anchor by rigidly supporting the piping However, in the conventional art, this method has been difficult for the following reasons.

Under such conditions, an internal-pressure thrust and a spring reaction force due to displacement of the bellows are applied to the equipment nozzle. The internal-pressure thrust can be absorbed by employing the above-mentioned bellows type expansion joint of pressure balanced type. However, when the piping member close to the bellows is fixed, all axial thermal expansion at the equipment nozzle must be absorbed by compression displacement of the bellows. When the bellows type expansion joint of pressure balanced type is employed, the pipe bore is enlarged to increase the spring constant of the single bellows, and the influence of an additional pressure balanced type bellows increases the spring constant more. As a result, the spring reaction force increases, and the loads on the equipment nozzle exceed the allowable value, making it impractical to set an anchor in the piping member close to the bellows within the scope of conventional art. Therefore, there is an urgent need to achieve a method for setting an anchor in the piping member close to the bellows by developing a pressure balanced type expansion joint system with a novel technology. That is to balance spring reaction force of main bellows by displacement at equipment nozzle with that of balanced bellows by thermal displacement at piping piece in the expansion joint system.

SUMMARY OF THE INVENTION

The present invention has been developed in view of the problems of the background art, and an object of the present invention is to provide a piping system that can reduce loads applied to an equipment nozzle with reliability although pipe bore is enlarged by recent trend to increase plant capacity.

According to an aspect of the present invention, a piping system includes: a bellows type expansion joint connected into an equipment nozzle of an equipment; a main pipe; a first pipe member that is connected to the equipment nozzle that extends from the equipment, and that is connected to one end of the main pipe via a first bellows; a second pipe member having one end connected to a side part of the main pipe; a third pipe member connected to the other end of the second pipe member via a second bellows;

a first tie rod support member (flange) fixed to an outer circumference of the first pipe member; a second tie rod support member (flange) fixed to an outer circumference of the third pipe member; tie rods that maintain a fixed distance between the first tie rod support member and the second tie rod support member; and an anchor disposed to set a portion of the main pipe near the first bellows as a fixed point.

In this case, lengths of the pipe members between the first tie rod support member and the second tie rod support member are determined so that the first bellows contracts due to thermal displacement at the equipment nozzle, the first pipe member, and the pipe member of the main pipe closer to the equipment nozzle than to the anchor, and the second bellows contracts so that it is displaced (contraction amount) equally to the first bellows by thermal expansion of all the pipe members between the first and second tie rod support members.

This configuration uses a structure of the bellows type expansion joint of pressure balanced type. Hence, the internal-pressure thrust generated by internal pressure can be balanced by the first bellows and the second bellows. A length of each piping member between the first tie rod support member and the second tie rod support member is adjusted, and both bellows are always set to be equal in contraction displacement with respect to thermal expansion of the equipment nozzle and all the piping members. As a result, spring reaction forces of the bellows are canceled.

Thus, according to the present invention, in the piping system, where pipes that are heavier than the equipment nozzle and that thermally expand (or thermally contract) due to the temperature of the internal fluids are connected, loads on the equipment can be reduced. As compared to the conventional design method in which a conventional hinge-type expansion joint, a gimbal type expansion joint and an universal expansion joint are used, a friction force or operation resistance that is applied to the equipment nozzle from the piping system can be more significantly reduced because the anchor set is set close to the nozzle. Moreover, the spring reaction forces of the bellows are canceled by using the displacement of the bellows caused by the thermal expansion of the piping members in the piping system, and hence loads on the equipment nozzle can be reduced more significantly than in the case of using the conventional pressure balanced type expansion joint.

The above and other objects, features and advantages of the present invention will become apparent from the following description with reference to the accompanying drawings which illustrate examples of the present invention.

Figure 1:
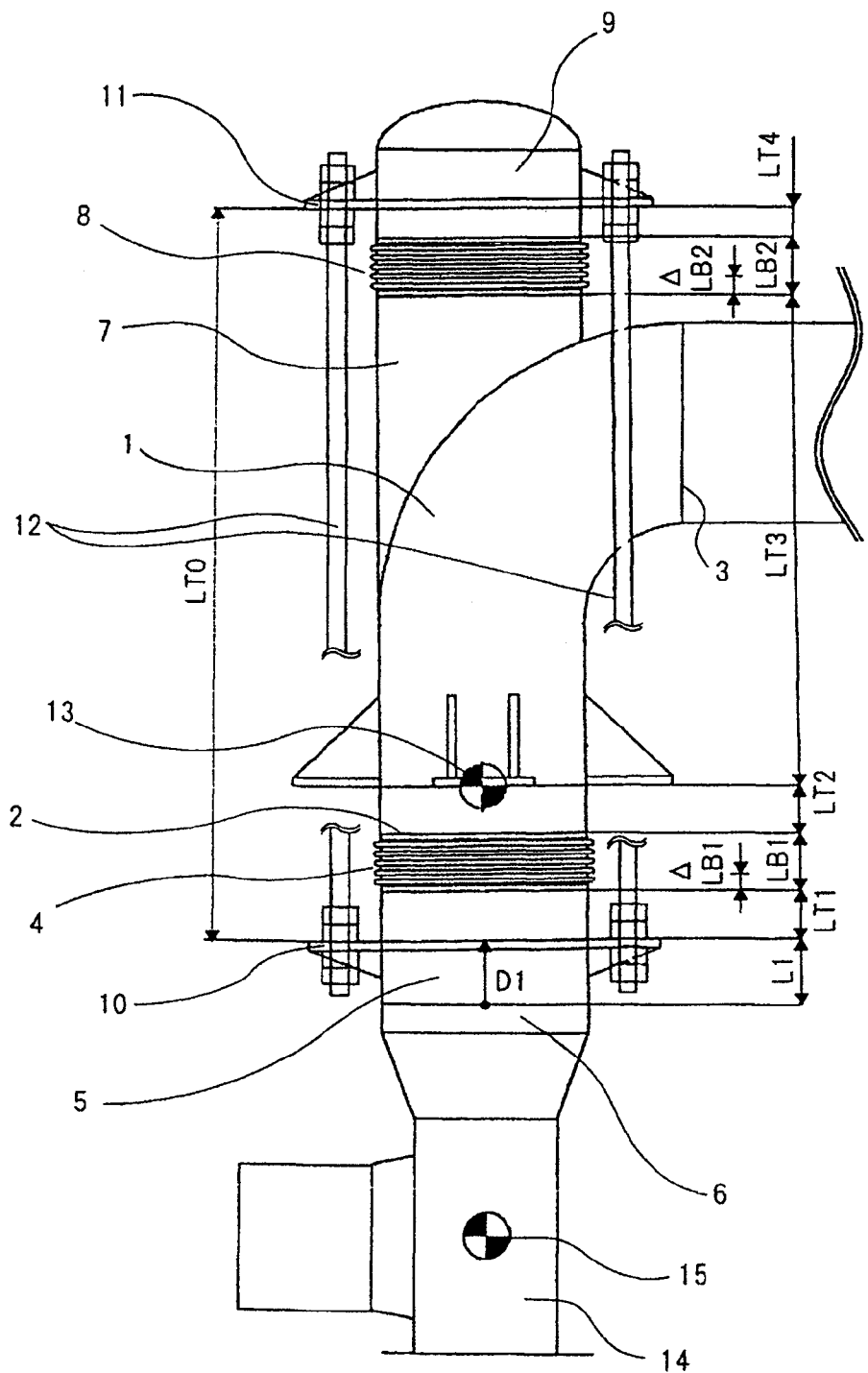
FIG. 1 is a side view showing in outline a piping system according to an exemplary embodiment of the present invention.

EXPLANATION OF LETTERS 1 elbow pipe (main pipe described in claims)
2 input terminal
3 discharge terminal
4 bellows (first bellows described in claims)
5 straight pipe (first piping member described in claims)
6 equipment nozzle
7 straight pipe (second piping member described in claims)
8 pressure balanced type bellows (second bellows described in claims
9 straight pipe (third piping member described in claims
10, 11 tie rod support flange (tie rod support member described in claims
12, 12A, 12B tie rod
13 anchor (fixed point)
14 equipment
15 equipment fixed point
21 straight pipe (main pipe described in claims)
22 link type tie plate (link described in claims)
23 support plate
24 conductor (second piping member described in claims)
25 cam plate

DETAILED DESCRIPTION OF THE EXEMPLARY EMBODIMENT

A piping system according to the present invention employs a bellows type expansion joint to which a pressure balance method is being applied. FIG. 1 is a side view showing in outline the piping system according to an exemplary embodiment. As shown, a lower end of the piping system is connected to an equipment nozzle such as a rotary machine, and the piping system is an apparatus designed to reduce an external force (pipe self-weight, thermal expansion of a pipe, spring reaction force of a bellows, internal-pressure thrust, loads of other places, frictional force, or operation resistance) on the equipment nozzle.

FIG. 1 shows an example where a pipe extending in a horizontal direction is connected into the equipment nozzle. Referring to FIG. 1, elbow pipe (curved pipe) 1 has input terminal 2 and discharge terminal 3. Discharge terminal 3 of elbow pipe 1 is connected to the pipe that extends in the horizontal direction. Input terminal 2 of elbow pipe 1 is connected to straight pipe 5 via bellows 4. Straight pipe 5 is connected to equipment nozzle 6. On a surface of an arch portion of elbow pipe 1, straight pipe 7 is welded to be in series with a straight-pipe portion of elbow pipe 1. Straight pipe 7 communicates with the inside of elbow pipe 1. Straight pipe 7 and elbow pipe 1 are equal in diameter. To set a temperature of straight pipe 7 equal to that of elbow pipe 1, the opening of a communication portion is preferably formed large so that internal fluids having some temperature can sufficiently flow into straight pipe 7. Thus, the elbow of elbow pipe 1 may be replaced with a tee. Straight pipe 9 is connected to an end of straight pipe 7 opposite elbow pipe 1 via bellows 8 equal in diameter to bellows 4. Straight pipes 5 and 9 respectively include tie rod support flanges 10 and 11. The two tie rod support flanges 10 and 11 are interconnected by a plurality of tie rods 12 arranged at equal intervals and equal in length. The flanges are taken as examples of tie rod support members in the exemplary embodiment. However, the tie rod support members are not limited to the flanges. Other support units can be applied.

The straight pipe portion of elbow pipe 1 close to bellows 4 is connected to anchor 13. This connection portion is not moved by any external force (namely, fixed point). Anchor 13 is made of a plate material, and welded to elbow pipe 1. An attaching portion of anchor 13 is fixed to a shaped-steel structure directly fixed to a concrete foundation in which equipment 14 is installed. Equipment 14 is fixed so as not to be moved by any external force. Fixed point 15 of the equipment and anchor 13 (fixed point) of the piping system are respectively base points of thermal expansion of the equipment nozzle and the piping system. However, these base points are not necessarily on a center line of equipment nozzle 6 shown in FIG. 1, as long as they are on a straight line vertical to the installation surface of equipment 14.

As described above, bellows 4 is disposed between equipment nozzle 6 and elbow pipe 1 connected to equipment nozzle 6, and the portion of elbow pipe 1 as close as possible to bellows 4 on manufacturing is set as the fixed point by using anchor 13. Thus, an external force of the piping system is prevented from being directly applied on the equipment while contraction (namely, spring reaction force) of bellows 4 is reduced as much as possible. The portion as close as possible to bellows 4 on manufacturing can appropriately be determined from a distance larger by, for example, four to five times than a thickness of the pipe from a connection terminal (welding line) of bellows 4 and elbow pipe 1 in view of a thermal influence, or the other restrictions on manufacturing or installation.

In the piping system, an axial internal-pressure thrust is applied on both ends of bellows 4 due to the pressure of fluids that pass through elbow pipe 1 (pipe inner pressure). A spring reaction force generated by displacement of bellows 4 and bellows 8, when each piping member is thermally expanded, is applied to equipment nozzle 6. However, when an internal-pressure thrust is applied to bellows 4, an internal-pressure thrust is also applied to bellows 8. A downward internal-pressure thrust of bellows 4 is transmitted to straight pipe 5, while an upward internal-pressure thrust of bellows 8 is transmitted to straight pipe 9. However, both internal-pressure thrusts cancel each other because straight pipes 5 and 9 are interconnected by tie rods 12. Hence, no internal-pressure thrust of the bellows is applied to equipment nozzle 6.

For easy understanding, it is presumed that displacement due to thermal expansion between an upper end of tie rod support flange 10 and a lower end of tie rod support flange 11 is not taken into consideration. Then, bellows 4 contracts with respect to thermal movement of equipment nozzle 6, while bellows 8 expands by an equal amount, and hence spring reaction forces of the bellows generated by such displacement are applied to equipment nozzle 6 in the same direction.

The present invention employs the following design approach to prevent application of loads to equipment nozzle 6 by canceling the spring reaction forces of bellows 4 and 8 generated by the displacement.

First, thermal expansion from equipment nozzle 6 to anchor 13 is checked. Concerning thermal expansion of the members above equipment nozzle 6, straight pipe 5, and part of elbow part 1 under anchor 13 of elbow pipe 1, bellows 4 contracts and absorbs the thermal expansion by all members because anchor 13 is fixed. Next, thermal expansion between tie rod support flanges 10 and 11 is checked. The members between tie rod support flanges 10 and 11 move up as a whole while the length is maintained by thermal expansion of equipment nozzle 6. Because of holding between these portions by tie rod 12, bellows 4 and bellows 8 contract and absorb thermal expansion of elbow pipe 1, straight pipe 7, the members close to elbow pipe 1 from tie rod support flange 10 of straight pipe 5, and the members close to straight pipe 7 from tie rod support flange 11 of straight pipe 9.

The contraction amount of bellows 4 is determined based on the presence of anchor 13 in elbow pipe 1. The contraction amount of bellows 8 is determined by remaining contraction amount between tie-rod support flange 10 and 11. The distance LT0 between tie rod flanges 10 and 11 is enough long so that displacement of bellows 8 is also in contracting direction by thermal expansion between the tie-rod flanges taking bigger than the displacement at equipment nozzle 6. Furthermore if the distance LT0 is adequately adjusted by strict calculation of thermal expansion, contraction amounts spring reaction forces by bellows 4 and bellows 8 can be same and thus spring reaction force by bellows 4 and bellows 8 can be equalized. As a result, no spring reaction force of the bellows is applied to equipment nozzle 6, although equipment nozzle 6 is displaced.

FIG. 1 shows parameters used in a calculation formula, which are added to the configuration of the piping system according to the exemplary embodiment. An outline of the design parameters is as follows:

D1: displacement amount [millimeters] due to temperature change of equipment nozzle (direction of tie rod support flange 10 seen from equipment nozzle 6 is plus)

L1: length [millimeters] of portion from connection terminal of straight pipe 5 with equipment nozzle 6 to end of tie rod support flange 10 opposite equipment nozzle 6

LT0: length [millimeters] of tie rod 12 between end of tie rod support flange 10 opposite equipment nozzle 6 and end of tie rod support flange 11 opposite equipment nozzle 6

LT1: length [millimeters] from end of straight pipe 5 opposite equipment nozzle 6 of tie rod support flange 10 to connection terminal of straight pipe 5 with bellows 4

LB1: axial length [millimeters] of bellows 4

ΔLB1: axial displacement amount [millimeters] of bellows 4 (contraction direction is plus)

LT2: length [millimeters] of portion of elbow pipe 1 from connection terminal of elbow pipe 1 with bellows 4 to fixed point (anchor 13)

LT3: length [millimeters] of pipe portion from fixed point (anchor 13) to connection terminal of bellows 8 with straight pipe 7

LB2: axial length [millimeters] of bellows 8

ΔLB2: axial displacement amount [millimeters] of bellows 8 (contraction direction is plus)

LT4: length [millimeters] of portion of straight pipe 9 from connection terminal of straight pipe 9 with bellows 8 to end of tie rod support flange 11 on equipment nozzle 6 side $\alpha_{(t)}$: coefficient of thermal expansion [–] of piping member when normal temperature changes to temperature t° C.

$k_{(B1, t)}$: spring constant [N/mm] at temperature t° C. of bellows 4

$k_{(B2, t)}$: spring constant [N/mm] at temperature t° C. of bellows 8

Calculation formulas used for designing the piping system are as follows.

In FIG. 1, thermal expansion from the fixed point (anchor 15) of the equipment to the fixed point (anchor 13) is calculated. The displacement amount (contraction) ΔLB1 of the bellows 4 is calculated by adding a displacement amount due to thermal expansion of the pipe portion from the equipment nozzle to the fixed point of the anchor 13 to thermal expansion of the equipment nozzle 6 from the fixed point (anchor 15) of the equipment, namely, a displacement amount (D1) of the equipment nozzle 6. Hence, the following formula 1 is established:

$$\Delta LB1 = D1 + \alpha_{(t)}(L1 + LT1 + LT2) \qquad \text{formula 1}$$

In formula 1, assuming that the temperature distribution is uniform and materials are similar in the piping system, displacements due to thermal expansion of the respective pipe portions are calculated by the coefficient of thermal expansion $\alpha_{(t)}$ at the same temperature. However, when the temperature and the material vary from one pipe portion to another, the coefficient of thermal expansion must be changed for each pipe portion to perform calculation.

In FIG. 1, when it is presumed that the temperature of the tie rods is unchanged, the length LT0 of tie rod 12 between the end of tie rod support flange 10 opposite equipment nozzle 6 and the end of tie rod support flange 11 on equipment nozzle 6 side becomes fixed irrespective of temperature changes of the other pipe portions. The sum of displacements due to thermal expansion of all the pipe portions there between is accordingly equal to the sum of displacements (contraction amounts) of bellows 4 and bellows 8. Hence, following formula 2 is established:

$$\alpha_{(t)}(LT1 + LT2 + LT3 + LT4) = \Delta LB1 + \Delta LB2 \qquad \text{formula 2}$$

Assuming that spring constants of bellows 4 and bellows 8 are equal because of the condition of the temperature distribution, spring reaction forces of both bellows may be equal when the bellows are equal in displacement. When contraction displacement of bellows 4 and bellows 8 is always equal to displacement due to thermal expansion of equipment nozzle 6 and of all the pipe portions, spring reaction forces of the bellows always cancel each other, thus preventing application of the spring reaction forces of the bellows on equipment nozzle 6. Thus, in formula 2, when bellows 4 and 8 are equal in displacement, $\Delta LB2$ can be replaced with $\Delta LB1$. Hence, the following formula 3 can be established:

$$2 \cdot \Delta LB1 = \alpha_{(t)}(LT1 + LT2 + LT3 + LT4) \qquad \text{formula 3}$$

As described above, the distance LT0 between the upper end of tie rod support flange 10 and the lower end of tie rod support flange 11 is longer than that in the conventional bellows type expansion joint of pressure balanced type. It is because in formula 2, the total displacement amount of thermal expansion in the left side is set large, and the value of $\Delta LB2$ is plus (namely, contraction) as in the case of $\Delta LB1$. To match the length of this interval with the formula, it is appropriate to adjust the size of LT3 in FIG. 1.

When $\Delta LB1$ is deleted from formulas 1 and 3 to derive a formula for calculating LT3, the following formula 4 is established:

$$LT3 = 2 \cdot D1/\alpha_{(t)} + 2 \cdot L1 + LT1 + LT2 - LT4 \qquad \text{formula 4}$$

In the piping system according to the exemplary embodiment shown in FIG. 1, providing the size of LT3 calculated by formula 4 enables absorption of movement of equipment nozzle 6 with respect to displacement D1 (only in vertical direction) due to thermal expansion of equipment nozzle 6 caused by a temperature change, and cancellation of the spring reaction forces of bellows 4 and 8 in this case. The piping system according to the exemplary embodiment has the structure of the bellows type expansion joint of pressure balanced type, and hence the internal-pressure thrust generated by the internal pressure can also be canceled. As a result, an external force applied from the piping system on the equipment nozzle can be suppressed as much as possible.

Calculation examples are as follows:
D1=50 [millimeters]
L1=500 [millimeters]
LT1=LT2=LT4=500 [millimeters]
LB1=LNB2=1000 [millimeters]
$\alpha_{(t)}$=0.01392[-] (when pipe material is stainless steel 304H, and temperature changes from about 20° C. to about 750° C.)
LT3=2.50/0.01392+2·500+500+500−500=8684 [millimeters]
LT0=500+1000+500+8684+1000+500=12184 [millimeters]
$\Delta LB1 = \Delta LB2 = 50 + 0.01392 \cdot (500 + 500 + 500) = 71$ [millimeters]

In the piping system according to the exemplary embodiment, the elbow pipe is used as the main pipe. However, a tee can be used instead.

The formulas 1, 2, 3 and 4 have been derived based on the assumption that the coefficients of thermal expansion of the respective pipe portions are all equal at $\alpha_{(t)}$. More general formulas 1a, 2a, 3a, 4a and 5 capable of dealing with a case where coefficients of thermal expansion are different due to dissimilarity in temperature and material among the pipe portions are as follows. In the formulas, a coefficient of thermal expiation at each pipe portion, for example, at a size L1 of straight pipe 5 shown in FIG. 5, is $\alpha_{(L1, t)}$.

$$\Delta LB1 = D1 + \alpha_{(L1,t)} \cdot L1 + \alpha_{(LT1,t)} \cdot LT1 + \alpha_{(LT2,t)} \cdot LT2 \qquad \text{formula 1a}$$

$$\alpha_{(LT1,t)} \cdot LT1 + \alpha_{(LT2,t)} \cdot LT2 + \alpha_{(LT3,t)} \cdot LT3 + \alpha_{(LT4,t)} \cdot LT4 = \Delta LB1 + \Delta LB2 \qquad \text{formula 2a}$$

When the bellows are different from each other in temperature and material, the theory that spring reaction forces of the bellows are equal when displacements of the bellows are equal has not been established. Thus, spring constants of the bellows at the respective temperatures and an increase in spring reaction force caused by thermal expansion of the bellows themselves must be taken into consideration. For this reason, a condition when bellows 4 and bellows 8 being equal in spring reaction force can be represented by the following formula 5:

$$k_{(B1,t)} \cdot (\Delta LB1 + \alpha_{(LB1,t)} \cdot LB1) = k_{(B2,t)} \cdot (\Delta LB2 + \alpha_{(LB2,t)} \cdot LB2) - F \qquad \text{formula 5}$$

In formula 5, an adjustment force F is set such that the direction (upward in FIG. 1) of tie rod support flange 10 seen from the equipment nozzle is plus. When the spring reaction forces of bellows 4 and bellows 8 are balanced to be completely equal, the adjustment force F is zero. When the balance is broken, and the spring reaction forces are balanced by taking into account a frictional force or resistance of the hanger, its value is used.

When $\Delta LB2$ is deleted from formula 2a and formula 5, the following formula 3a is acquired:

$$(1 + k_{(B1,t)}/k_{(B2,t)}) \cdot \Delta LB1 + k_{(B1,t)}/k_{(B2,t)} \cdot \alpha_{(LB1,t)} \cdot LB1 - \alpha_{(LB2,t)} \cdot LB2 + 1/k_{(B2,t)} \cdot F = \alpha_{(LT1,t)} \cdot LT1 + \alpha_{(LT2,t)} \cdot LT2 + \alpha_{(LT3,t)} \cdot LT3 + \alpha_{(LT4,t)} \cdot LT4 \qquad \text{formula 3a}$$

When $\Delta LB1$ is deleted from formula 3a and formula 1a, and LT3 remains on the left side, the following formula 4a is acquired:

$$LT3 = (1 + k_{(B1,t)}/k_{(B2,t)}) \cdot (D1/\alpha_{(LT3,t)} + \alpha_{(L1,t)}/\alpha_{(LT3,t)} \cdot L1) + k_{(B1,t)}/k_{(B2,t)} \cdot \alpha_{(LT1,t)}/\alpha_{(LT3,t)} \cdot LT1 + k_{(B1,t)}/k_{(B2,t)} \cdot \alpha_{(LT2,t)}/\alpha_{(LT3,t)} \cdot LT2 - \alpha_{(LT4,t)}/\alpha_{(LT3,t)} \cdot LT4 + 1/k_{(B2,t)} \cdot \alpha_{(LT3,t)} \cdot F + k_{(B1,t)}/k_{(B2,t)} \cdot \alpha_{(LB1,t)}/\alpha_{(LT3,t)} \cdot LB1 - \alpha_{(LB2,t)}/\alpha_{(LT3,t)} \cdot LB2 \qquad \text{formula 4a}$$

Other Embodiments

Figure 2:
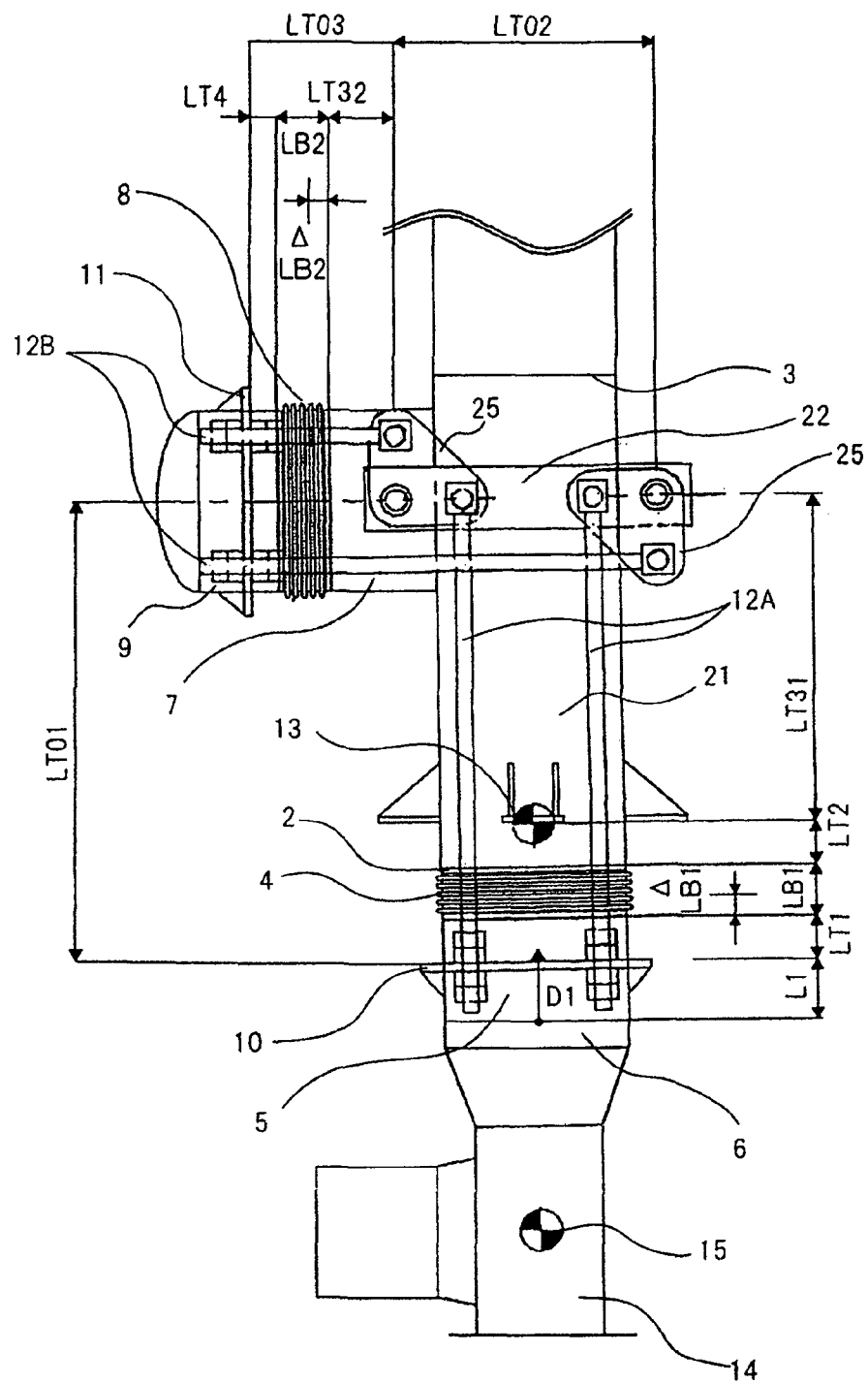
FIG. 2 is a side view showing a piping system according to another exemplary embodiment of the present invention.
Figure 3:
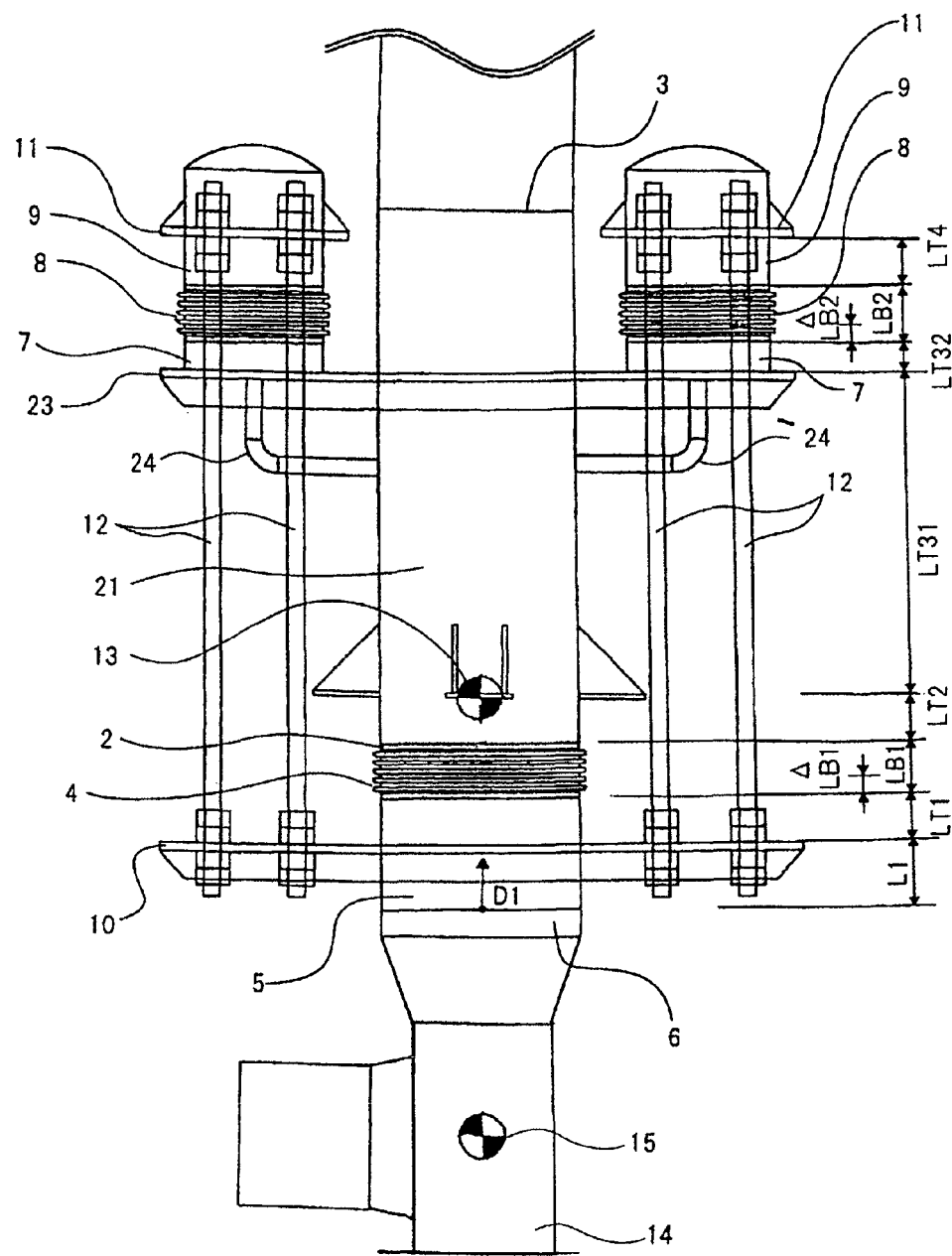
FIG. 3 is a side view showing a piping system according to yet another exemplary embodiment of the present invention.
Figure 4:
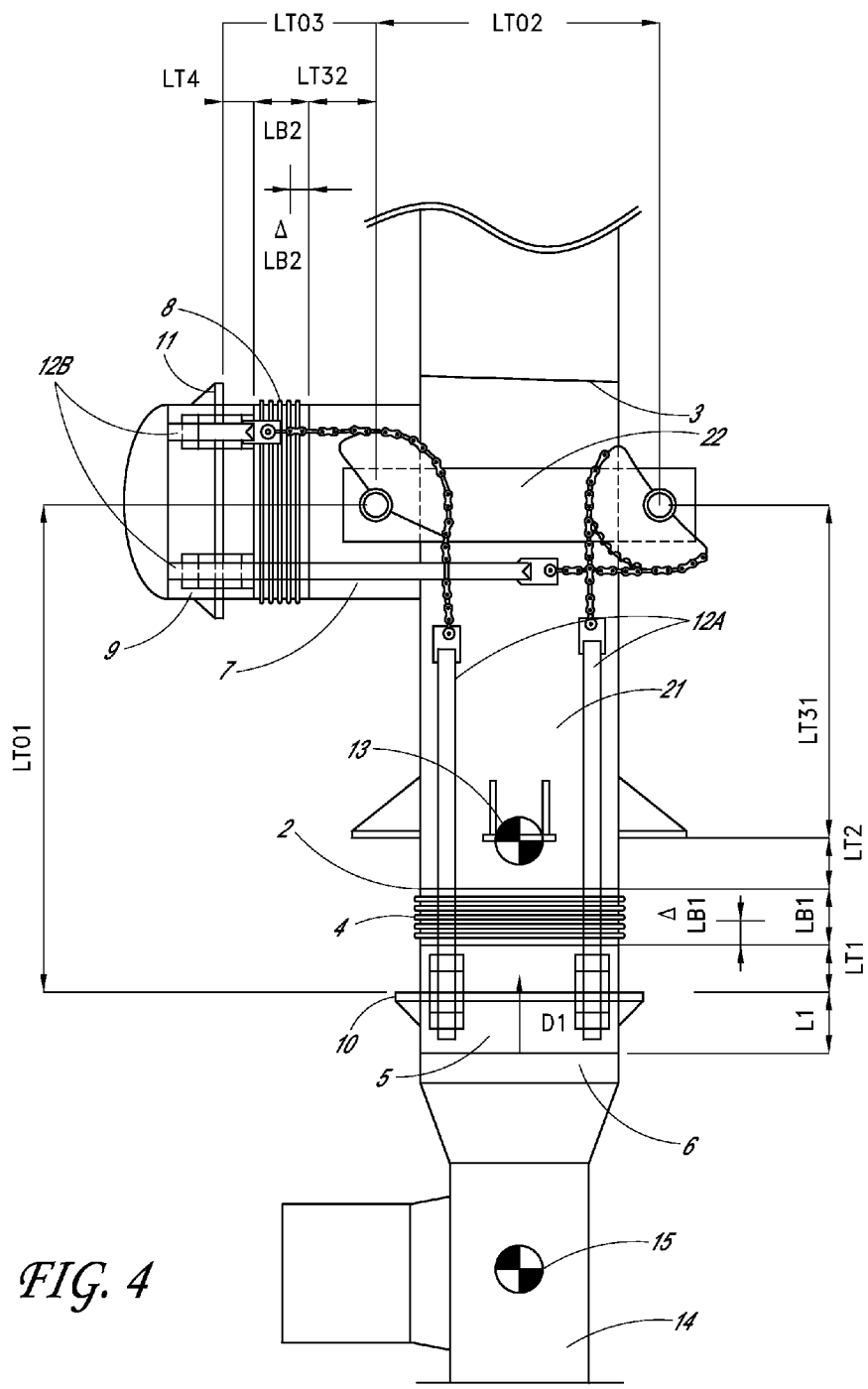
FIG. 4 is a side view showing a piping system according to further exemplary embodiment of the present invention.

The piping system shown in FIG. 1 is configured such that main pipe bellows 4 and pressure balanced type bellows 8 are located on the vertical straight line, and the pipe extends from equipment nozzle 6, and bends at elbow pipe 1 to bend in the horizontal direction. However, the pipe may extend straight in a vertical direction without being bent. FIGS. 2 and 3 show piping systems configured straight in the vertical direction. In FIGS. 2 and 3, components similar in function to those shown in FIG. 1 are denoted by similar reference numerals.

Referring to FIG. 2, a straight pipe 21 disposed in a vertical direction (vertical direction shown in FIG. 2) has input terminal 2 and discharge terminal 3. Discharge terminal 3 of straight pipe 21 is connected to a pipe that extends in the vertical direction. Input terminal 2 of straight pipe 21 is connected to straight pipe 5 via bellows 4 (main pipe bellows). Straight pipe 5 is connected to equipment nozzle 6. On an upper surface of straight pipe 21, straight pipe 7 is welded to extend in a direction perpendicular to the extending direction of straight pipe 21. Straight pipe 7 communicates with the inside of straight pipe 21. Straight pipe 9 is connected to an end of straight pipe 7 opposite straight pipe 21 via bellows 8 (pressure balanced type bellows) equal in diameter to bellows 4. Straight pipes 5 and 9 respectively include tie rod support flanges 10 and 11. A plurality of tie rods 12A arranged at equal intervals are connected to tie rod support flange 10, and a plurality of tie rods 12B arranged at equal intervals are connected to tie rod support flange 11. Tie rod 12A and tie rod 12B extend in directions orthogonal to each other, and are connected to cam plates 25 fitted in a shaft attached to tie plate 22 disposed in straight pipe 21. Thus, even when bellows 4 (main pipe bellows) and bellows 8 (pressure balanced type bellows) are not in a straight line, internal-pressure thrusts thereof can be balanced. The difference in size between straight pipe 21 that is thermally expanded and tie rod 12A that is not thermally expanded can be transmitted to tie rod support flange 11 by rotating cam plates 25. However, tie plate 22 is fixed to straight pipe 21, and must be strong enough to receive a force of changing the direction of an internal-pressure thrust generated by internal pressure. In order to maintain application of formulas 2, 3, and 4, tie plate 22 is insulated to suppress thermal expansion with respect to the temperature in straight pipe 21, and the length of LT02 must be kept unchanged.

A straight pipe portion of straight pipe 21 close to bellows 4 is connected to anchor 13. This connection portion is set as a place not moved by any external force (fixed point). As in the example shown in FIG. 1, anchor 13 is fixed by a shaped-steel structure directly fixed to a concrete foundation in which equipment 14 is installed.

Thus, in the piping system, as in the example shown in FIG. 1, spring reaction forces of the bellows can be canceled by adjusting sizes of the pipe portions.

In the example shown in FIG. 2, size LT3 in formula 4 corresponds to LT31+LT32: LT31 is a length [millimeters] of a pipe portion from the fixed point (anchor 13) to the rotation axis (center of cam plate 25) of tie plate 22, and LT32 is the length [millimeters] from one (center of left cam plate 25 shown in FIG. 2) of rotation axes 25 of tie plate 22 close to second bellows 8 to the connection terminal of the second bellows and second pipe member 7. In other words, size LT31 and size LT32 can be determined by appropriately dividing a calculation result of the right side $(2 \cdot D1/\alpha_{(t)} + 2 \cdot L1 + LT1 + LT2 - LT4)$ of formula 4. By constructing the piping system shown in FIG. 2 using the determined sizes LT31 and LT32, with respect to displacement (only in a vertical direction) due to thermal expansion of equipment nozzle 6 caused by a temperature change, movement of equipment nozzle 6 can be canceled, and the spring reaction force of bellows 4 at this time can be canceled. This piping system also has a structure of a bellows type expansion joint of an pressure balanced type, and hence the internal-pressure thrust generated by internal pressure can be canceled. As a result, the external force applied from the piping system on the equipment nozzle can be reduced as much as possible.

When the temperature distribution in the piping system is uniform, and spring constants of bellows 4 and bellows 8 are equal to each other, the size of LT31 is calculated by the following formula 6:

$$LT31 = 2 \cdot D1/\alpha_{(t)} + 2 \cdot L1 + LT1 + LT2 - LT4 - LT32 \quad \text{formula 6}$$

When the pipe portions are not equal in temperature or material, but different in coefficient of thermal expansion, the size of LT31 is calculated by the following formula 7 (calculated by replacing $\alpha_{(LT3t,\ t)} \cdot LT3$ in formula 2a with $\alpha_{(LT31,\ t)} \cdot LT31 + \alpha_{(LT32,\ t)} \cdot LT32$):

$$LT31 = (1 + k_{(B1,t)}/k_{(B2,t)}) \cdot (D1/\alpha_{(LT31,t)} + \alpha_{(L1,t)}/\alpha_{(LT31,t)} \cdot L1) + k_{(B1,t)}/k_{(B2,t)} \cdot \alpha_{(LT1,t)}/\alpha_{(LT31,t)} \cdot LT1 + k_{(B1,t)}/k_{(B2,t)} \cdot \alpha_{(LT2,t)}/\alpha_{(LT31,t)} \cdot LT2 - \alpha_{(LT4,t)}/\alpha_{(LT31,t)} \cdot LT4 + k_{(B1,t)}/k_{(B2,t)} \cdot \alpha_{(LB1,t)}/\alpha_{(LT31,t)} \cdot LB1 - \alpha_{(LB2,t)}/\alpha_{(LT31,t)} \cdot LB2 + 1/k_{(B2,t)} \cdot \alpha_{(LT31,t)} \cdot F - \alpha_{(LT32,t)}/\alpha_{(LT31,t)} \cdot LT3 \quad \text{formula 7}$$

Another example where a pipe extends straight in a vertical direction is a piping system that includes a plurality of pressure balanced type bellows shown in FIG. 3.

Pulleys and chains can be used in place of cam plates 25 and tie rods 12A and 12B. All the tie rods can be replaced with chains, or some tie rods can be replaced with chains.

Referring to FIG. 3, on an upper surface of straight pipe 21, support plate 23 is welded to extend in a direction perpendicular to the extending direction of straight pipe 21. Two pipes 7 are fixed on an upper surface of support plate 23, and arranged in parallel sandwiching straight pipe 21. Each straight pipe 7 communicates with the inside of straight pipe 7 via each conductor 24.

Straight pipe 9 is connected to an end of each pipe 7 opposite support plate 23 via bellows 8 (pressure balanced type bellows) that is equal in cross-sectional area (namely, equal internal-pressure reaction force) and in bellows spring reaction force to bellows 4 at the sum of two places of both sides of straight pipe 21. To describe more specifically for better understanding, the single bellows 8 has a cross-sectional area ½ times larger than that of bellows 4, and hence its diameter is larger by 1/√2 times (effective bellows diameter: intermediate diameter between bottom and peak of bellows). The spring constant is larger by nearly 1√2 times in proportion to this diameter when bellows cross-sectional shapes are similar. Thus, by adjusting the bottom-to-peak height of the bellows to be larger, and setting the spring constant to be larger by ½ times than that of bellows 4, balance can be kept with bellows 4 by bellows 8 at two places. Straight pipes 5 and 9 respectively include tie rod support flanges 10 and 11. The two tie rod support flanges 10 and 11 are interconnected by a plurality of tie rods 12 arranged at equal intervals and equal in length. The straight pipe portion of straight pipe 21 close to bellows 4 is connected to anchor 13. This connection portion is set as a place not moved by any external force (fixed point). As in the example shown in FIG. 1, anchor 13 is fixed by a shaped-steel structure directly fixed to the concrete foundation in which equipment 14 is installed.

Thus, in the piping system, by using formulas 6 and 7, spring reaction forces of the bellows can be canceled by adjusting sizes of the pipe portions. In this piping system, there is no link type cam plate similar to that shown in FIG. 2, and hence the frictional force and resistance are reduced more.

However, in FIG. 3, communication is established with straight pipes 7 and 9 through conductor 24 relatively smaller in bore than straight pipe 21, and the structure is closed beyond pipes 7 and 9. Thus, flowing of internal fluids stops here. The flowing structure of heat conducted from straight pipe 21 through the pipe member is smaller than those shown in FIGS. 1 and 2, and hence it is difficult to maintain temperatures equal between straight pipes 7 and 9 and straight pipe 21. This necessitates use of a value of a coefficient of thermal expansion $\alpha_{(t)}$ different from that of straight pipe 21. For example, when the temperatures of straight pipes 7 and 9 and bellows 8 are not increased, causing no thermal expansion, $\alpha_{(LT3, t)}$, $\alpha_{(LB2, t)}$ and $\alpha_{(LT4, t)}$ become zero in formula 7. The formula is accordingly simplified, and the size of LT31 is calculated by the following formula 8:

$$LT31 = (1 + k_{(B1,t)}/k_{(B2,t)}) \cdot (D1/\alpha_{(LT31,t)} + \alpha_{(L1,t)}/\alpha_{(LT31,t)} \cdot L1) + k_{(B1,t)}/k_{(B2,t)} \cdot \alpha_{(LT1,t)}/\alpha_{(LT31,t)} \cdot LT1 + k_{(B1,t)}/k_{(B2,t)} \cdot \alpha_{(LT2,t)}/\alpha_{(LT31,t)} \cdot LT2 + k_{(B1,t)}/k_{(B2,t)} \cdot \alpha_{(LB1,t)}/\alpha_{(LT31,t)} \cdot LB1 + 1/k_{(B2,t)}/\alpha_{(LT31,t)} \cdot F$$

formula 8

When straight pipes 5 and 21 are equal in temperature, material, and coefficient of thermal expansion, $\alpha_{(L1, t)}$, $\alpha_{(LT1, t)}$, $\alpha_{(LT2, t)}$, and $\alpha_{(LT31, t)}$ are equal. Thus, by representatively using $\alpha_{(L1, t)}$, the size of LT31 is calculated by the following formula 9:

$$LT31 = (1 + k_{(B1,t)}/k_{(B2,t)}) \cdot (D1/\alpha_{(L1,t)} + L1) + k_{(B1,t)}/k_{(B2,t)} \cdot (LT1 + LT2) + k_{(B1,t)}/k_{(B2,t)} \cdot \alpha_{(LB1,t)}/\alpha_{(L1,t)} \cdot LB1 + 1/k_{(B2,t)}/\alpha_{(L1,t)} \cdot F$$

formula 9

While FIGS. 1 to 3 do not show any hanger support, for example, in FIG. 1, weights of straight pipe 5 and tie rod support flange 10 located below the bellows 4, straight pipe 9 and tie rod support flange 11 located above the pressure balanced type bellows 8, and tie rods 12 must be lifted by a spring support (or constant spring hanger lesser in load fluctuation caused by movement). The piping system must be supported at the center height of the pipe when used for a horizontal pipe. The frictional force and operation resistance must be reduced as much as possible in this case. Such a pipe support is not shown for simplicity.

The installation of such a constant spring hanger necessitates examination of initial loads of the constant spring hanger. According to the present invention, however, the pipe members above bellows 4 are fixed by anchor 13 not to be moved. Thus, loads lifted by the constant spring hanger to reduce loads on equipment nozzle 6 are limited to tie rods 12 and the pipe members connected by the tie rods. Loads of such main pipes as elbow pipe 1 and straight pipe 12, and pipes connected to the main pipes are supported by anchor 13. Loads are accordingly reduced more greatly than those when the constant spring hanger lifts almost the entire piping system in the piping system of the conventional type, and initial loads of the constant spring hanger can be greatly reduced. As a result, even when a larger bore of a pipe is accompanied by an increase in pipe loads, loads on the equipment nozzle can be reduced more greatly than in the conventional piping system.

The exemplary embodiments of the present invention have been described with reference to the accompanying drawings. However, the invention is no limited only to the piping system connected into equipment nozzle 6 that extends vertically (in the vertical direction) as shown. The piping system of the present invention can be applied in the extending direction of the equipment nozzle.

While preferred embodiments of the present invention have been described using specific terms, such description is for illustrative purposes only, and it is to be understood that changes and variations may be made without departing from the spirit or scope of the following claims.

What is claimed is:

1. A piping system that is connected to an equipment nozzle of a piece of equipment comprising:
   a main pipe;
   a first bellows that is connected to one end of the main pipe;
   a first pipe member that is connected to the equipment nozzle that extends from the equipment, and that is connected to one end of the main pipe via the first bellows;
   a second pipe member having one end connected to a side part of the main pipe;
   a second bellows that is connected to the other end of the second pipe opposite to the side part of the main pipe;
   a third pipe member connected to the other end of the second pipe member via the second bellows;
   a first tie rod support member fixed to an outer circumference of the first pipe member;
   a second tie rod support member fixed to an outer circumference of the third pipe member;
   tie rods that maintain a fixed distance between the first tie rod support member and the second tie rod support member; and
   an anchor attached to the main pipe near the first bellows as a fixed point,
   wherein lengths of the pipe members between the first tie rod support member and the second tie rod support member are determined so that the first bellows contracts by thermal expansion of the equipment nozzle, by thermal expansion of the first pipe member, and by thermal expansion of the pipe member of the main pipe closer to the equipment nozzle than to the anchor, and the second bellows contracts to be displaced by a contraction amount equal to the first bellows by thermal expansion of all the pipe members between the first and second tie rod support members.

2. The piping system according to claim 1, wherein the man pipe is an elbow pipe or a tee.

3. The piping system according to claim 1, wherein the main pipe includes a straight pipe.

4. The piping system according to claim 3,
   wherein the second pipe member is connected to a side face of the main pipe opposite the equipment nozzle side of the anchor, and extends in a direction having a predetermined angle to an extending direction of the main pipe, and the tie rods are arranged having the angle by using a tie plate and cam plates.

5. The piping system according to claim 4, wherein the following formula is satisfied:

$$LT31 = (1 + k_{(B1,t)}/k_{(B2,t)}) \cdot (D1/\alpha_{(LT31,t)} + \alpha_{(L1,t)}/\alpha_{(LT31,t)} \cdot L1) + k_{(B1,t)}/k_{(B2,t)} \cdot \alpha_{(LT1,t)}/\alpha_{(LT31,t)} \cdot LT1 + k_{(B1,t)}/k_{(B2,t)} \cdot \alpha_{(LT2,t)}/\alpha_{(LT31,t)} \cdot LT2 + k_{(B1,t)}/k_{(B2,t)} \cdot \alpha_{(LB1,t)}/\alpha_{(LT31,t)} \cdot LB1 + 1/k_{(B2,t)}/\alpha_{(LT31,t)} \cdot F$$

D1: displacement amount [millimeters] caused by a temperature change of the equipment nozzle L1: length [millimeters] of the portion of the first pipe member from the connection terminal with the equipment nozzle to the first tie rod support member $\alpha_{(L1,t)}$: coefficient of thermal expansion when a normal temperature changes to a certain temperature of the portion of the first pipe member from the connection terminal with the equipment nozzle to the first tie rod support member LT1: length [millimeters] of the portion of the first pipe member from the end of the first tie rod support member opposite the equipment nozzle side to the first bellows $\alpha_{(LT1,t)}$: coefficient of thermal expansion when a normal temperature changes to a certain temperature of the portion of the first pipe member from the end of the first tie rod support member opposite the equipment nozzle side to the first bellows LT2: length [millimeters] of the pipe portion of the main pipe from the connection terminal of the main pipe with the first bellows to the anchor $\alpha_{(LT2,t)}$: coefficient of thermal expansion when a normal temperature changes to a certain temperature of the pipe portion of the main pipe from the connection terminal of the main pipe with the first bellows to the anchor LT31: length [millimeters] of a portion from the anchor to a rotation axis disposed in the tie plate, the portion being included in the pipe portion from the anchor to the second bellows $\alpha_{(LT3,t)}$: coefficient of thermal expansion when a normal temperature changes to a certain temperature of the portion from the anchor to the rotation axis disposed in the tie plate, the portion being included in the pipe portion from the anchor to the second bellows LT32: length [millimeters] of a portion, from a rotation axis disposed in the tie plate and closer to the second bellows, to the connection terminal of the scone bellows with the second pipe member, the portion being included in the pipe portion from the anchor to the second bellows $\alpha_{(LT32,t)}$: coefficient of thermal expansion when a normal temperature changes to a certain temperature of the portion, from the rotation axis disposed in the tie plate and closer to the second bellows, to the connection terminal of the scone bellows with the second pipe member, the portion being included in the pipe portion from the anchor to the second bellows LT4: length [millimeters] of the portion of the third pipe member from the connection terminal of the third pipe member with the second bellows to the end of the second tie rod support member on the equipment nozzle side $\alpha_{(LT4,t)}$: coefficient of thermal expansion when a normal temperature changes to a certain temperature of the portion of the third pipe member from the connection terminal of the third pipe member with the second bellows to the end of the second tie rod support member on the equipment nozzle side $k_{(B1,t)}$: spring constant [N/mm] at a certain temperature of the first bellows $k_{(B2,t)}$: spring constant [N/mm] at a certain temperature of the second bellows F[N]: adjustment force for lifting the piping system.

6. The piping system according to claim 4, wherein pulleys and chains are used in place of the cam plates and some or all of the tie rods.

7. A piping system comprising:
a bellows type expansion joint connected into an equipment nozzle of an equipment;
a main pipe;
a first pipe member that is connected to the equipment nozzle that extends from the equipment, and that is connected to one end of the main pipe via the first bellows;
a second pipe member having one end connected to a side part of the main pipe;
a third pipe member connected to the other end of the second pipe member via the second bellows;
a first tie rod support member fixed to an outer circumference of the first pipe member;
a second tie rod support member fixed to an outer circumference of the third pipe member;
tie rods that maintain a fixed distance between the first tie rod support member and the second tie rod support member; and
an anchor disposed to set a portion of the main pipe near the first bellows as a fixed point,
wherein lengths of the pipe members between the first tie rod support member and the second tie rod support member are determined so that the first bellows contracts by thermal expansion of the equipment nozzle, by thermal expansion of the first pipe member, and by thermal expansion of the pipe member of the main pipe closer to the equipment nozzle than to the anchor, and the second bellows contracts to be displaced by a contraction amount equal equally to the first bellows by thermal expansion of all the pipe members between the first and second tie rod support members,
wherein the following formula is satisfied:

$$LT3 = (1 + k_{(B1,t)}/k_{(B2,t)}) \cdot (D1/\alpha_{(LT3,t)} + \alpha_{(L1,t)}/\alpha_{(LT3,t)} \cdot L1) + k_{(B1,t)}/k_{(B2,t)} \cdot \alpha_{(LT1,t)}/\alpha_{(LT3,t)} \cdot LT1 + k_{(B1,t)}/k_{(B2,t)} \cdot \alpha_{(LT2,t)}/\alpha_{(LT3,t)} \cdot LT2 - \alpha_{(LT4,t)}/\alpha_{(LT3,t)} \cdot LT4 + 1/k_{(B2,t)}/\alpha_{(LT3,t)} \cdot F + k_{(B1,t)}/k_{(B2,t)} \cdot \alpha_{(LB1,t)}/\alpha_{(LT3,t)} \cdot LB1 - \alpha_{(LB2,t)}/\alpha_{(LT3,t)} \cdot LB2$$

D1: displacement amount [millimeters] caused by a temperature change of the equipment nozzle L1: length [millimeters] of a portion of the first pipe member from a connection terminal with the equipment nozzle to the first tie rod support member $\alpha_{(L1,t)}$: coefficient of thermal expansion when a normal temperature changes to a certain temperature of the portion of the first pipe member from a connection terminal with the equipment nozzle to the first tie rod support member LT1: length [millimeters] of a portion of the first pipe member from an end of the first tie rod support member opposite the equipment nozzle side to the first bellows $\alpha_{(LT1,t)}$: coefficient of thermal expansion when a normal temperature changes to a certain temperature of the portion of the first pipe member from the end of the first tie rod support member opposite the equipment nozzle side to the first bellows LT2: length [millimeters] of a pipe portion of the main pipe from a connection terminal of the main pipe with the first bellows to the anchor $\alpha_{(LT2,t)}$: coefficient of thermal expansion when a normal temperature changes to a certain temperature of the pipe portion of the main pipe from a connection terminal of the main pipe with the first bellows to the anchor LT3: length [millimeters] of a pipe portion from the anchor to the second bellows $\alpha_{(LT3,t)}$: coefficient of thermal expansion when a normal temperature changes to a certain temperature of the pipe portion from the anchor to the second bellows LT4: length [millimeters] of a portion of the third pipe member from a connection terminal of the third pipe member with the second bellows to an end of the second tie rod support member on the equipment nozzle side $\alpha_{(LT4,t)}$: coefficient of thermal expansion when a normal temperature changes to a certain temperature of a portion of the third pipe member from the connection terminal of the third pipe member with the second bellows to the end of the second tie rod support member on the equipment nozzle side $k_{(B1,t)}$: spring constant [N/mm] at a certain temperature of the first bellows $k_{(B2,t)}$: spring constant [N/mm] at a certain temperature of the second bellows F[N]: adjustment force for lifting the piping system.

8. A piping system comprising:
a bellows type expansion joint connected into an equipment nozzle of a piece of equipment;
a main pipe;
a first pipe member that is connected to the equipment nozzle that extends from the equipment, and that is connected to one end of the main pipe via the first bellows;
a second pipe member having one end connected to a side part of the main pipe;
a third pipe member connected to the other end of the second pipe member via the second bellows;
a first tie rod support member fixed to an outer circumference of the first pipe member;
a second tie rod support member fixed to an outer circumference of the third pipe member;
tie rods that maintain a fixed distance between the first tie rod support member and the second tie rod support member; and
an anchor disposed to set a portion of the main pipe near the first bellows as a fixed point,
a support plate that is fixed to the side face of the main pipe and extends in a direction perpendicular to the extending direction of the main pipe,
wherein said one end of the second pipe member is connected to a side of the support plate opposite the equipment nozzle side, at least said two second pipe members are arranged parallel to each other in the main pipe, and a sum total of areas at an effective diameter of the second bellows is equal to an area at an effective bellows diameter of the first bellows,
wherein lengths of the pipe members between the first tie rod support member and the second tie rod support member are determined so that the first bellows contracts by thermal expansion of the equipment nozzle, by thermal expansion of the first pipe member, and by thermal expansion of the pipe member of the main pipe closer to the equipment nozzle than to the anchor, and the second bellows contracts to be displaced by a contraction amount equal equally to the first bellows by thermal expansion of all the pipe members between the first and second tie rod support members.

9. The piping system according to claim 8, wherein the following formula is satisfied:

$$LT31 = (1 + k_{(B1,t)}/k_{(B2,t)}) \cdot (D1/\alpha_{(LT31,t)} + \alpha_{(L1,t)}/\alpha_{(LT31,t)} \cdot L1) + k_{(B1,t)}/k_{(B2,t)} \cdot \alpha_{(LT1,t)}/\alpha_{(LT31,t)} \cdot LT1 + k_{B1,t}/k_{(B2,t)} \cdot \alpha_{(LT2,t)}/\alpha_{(LT31,t)} \cdot LT2 - \alpha_{(LT4,t)}/\alpha_{(LT31,t)} \cdot LT4 + k_{(B1,t)}/k_{(B2,t)} \cdot \alpha_{(LB1,t)}/\alpha(LT31,t) \cdot LB1 - \alpha_{(LB2,t)}/\alpha_{(LT31,t)} \cdot LB2 + 1/k_{(B2,t)}/a_{(LT31,t)} \cdot F - \alpha_{(LT32,t)}/\alpha(LT31,t) \cdot LT32$$

D1: displacement amount [millimeters] caused by a temperature change of the equipment nozzle L1: length [millimeters] of the portion of the first pipe member from the connection terminal with the equipment nozzle to the first tie rod support member $\alpha_{(L1,t)}$: coefficient of thermal expansion when a normal temperature changes to a certain temperature of the portion of the first pipe member from the connection terminal with the equipment nozzle to the first tie rod support member LT1: length [millimeters] of the portion of the first pipe member from the end of the first tie rod support member opposite the equipment nozzle side to the first bellows $\alpha_{(LT1,t)}$: coefficient of thermal expansion when a normal temperature changes to a certain temperature of the portion of the first pipe member from the end of the first tie rod support member opposite the equipment nozzle side to the first bellows LT2: length [millimeters] of the pipe portion of the main pipe from the connection terminal of the main pipe with the first bellows to the anchor $\alpha_{(LT2,t)}$: coefficient of thermal expansion when a normal temperature changes to a certain temperature of the pipe portion of the main pipe from the connection terminal of the main pipe with the first bellows to the anchor LT31: length [millimeters] of a portion from the anchor to a support member for fixing the second pipe member to the main pipe, the portion being included in the pipe portion from the anchor to the second bellows $\alpha_{(LT31,t)}$: coefficient of thermal expansion when a normal temperature changes to a certain temperature of the portion from the anchor to the support member for fixing the second pipe member to the main pipe, the portion being included in the pipe portion from the anchor to the second bellows LT32: length [millimeters] of a portion, from the support member for fixing the second pipe member to the main pipe, to the second bellows, the portion being included in the pipe portion from the anchor to the second bellows $\alpha_{(LT32,t)}$: coefficient of thermal expansion when a normal temperature changes to a certain temperature of the portion, from the support member for fixing the second pipe member to the main pipe, to the second bellows, the portion being included in the pipe portion from the anchor to the second bellows LT4: length [millimeters] of the portion of the third pipe member from the connection terminal of the third pipe member with the second bellows to the end of the second tie rod support member on the equipment nozzle side $\alpha_{(LT4,t)}$: coefficient of thermal expansion when a normal temperature changes to a certain temperature of the third pipe member from the connection terminal of the third pipe member with the second bellows to the end of the second tie rod support member on the equipment nozzle side $k_{(B1,t)}$: spring constant [N/mm] at a certain temperature of the first bellows $k_{(B2,t)}$: spring constant [N/mm] at a certain temperature of the second bellows F[N]: adjustment force for lifting the piping system.

* * * * *

UNITED STATES PATENT AND TRADEMARK OFFICE
CERTIFICATE OF CORRECTION

PATENT NO. : 8,622,438 B2  
APPLICATION NO. : 13/280733  
DATED : January 7, 2014  
INVENTOR(S) : Noda Page 1 of 1

It is certified that error appears in the above-identified patent and that said Letters Patent is hereby corrected as shown below:

Title page (item 57, Abstract) line 3, Change "nozzle" to --nozzle,--.

Title page (item 57, Abstract) line 5, After "to" delete "the other end of".

In the Specification

In column 4 at line 19, Change "claims" to --claims)--.

In column 4 at line 20, Change "claims" to --claims)--.

In column 4 at line 22, Change "claims" to --claims)--.

In column 11 at line 16, Change "$\alpha_{(LT3, t)},$" to --$\alpha_{(LT32, t)},$--.

In the Claims

In column 12 at line 40, Claim 2, change "man" to --main--.

In column 13 at line 27, Claim 5, change "scone" to --second--.

In column 13 at line 34, Claim 5, change "scone" to --second--.

In column 14 at line 16, Claim 7, before "to" delete "equally".

In column 15 at line 42, Claim 8, before "to" delete "equally".

Signed and Sealed this  
Fifth Day of August, 2014

Michelle K. Lee  
*Deputy Director of the United States Patent and Trademark Office*